US010151605B2

(12) United States Patent
Fujie et al.

(10) Patent No.: US 10,151,605 B2
(45) Date of Patent: Dec. 11, 2018

(54) ROTATION ANGLE DETECTION DEVICE AND ROTATION ANGLE DETECTION METHOD

(71) Applicant: Mitsubishi Electric Corporation, Tokyo (JP)

(72) Inventors: Kenichi Fujie, Tokyo (JP); Katsuya Tsujimoto, Tokyo (JP); Isao Tottori, Tokyo (JP); Naruki Suetake, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 22 days.

(21) Appl. No.: 15/514,349

(22) PCT Filed: Nov. 6, 2014

(86) PCT No.: PCT/JP2014/079403
§ 371 (c)(1),
(2) Date: Mar. 24, 2017

(87) PCT Pub. No.: WO2016/071980
PCT Pub. Date: May 12, 2016

(65) Prior Publication Data
US 2017/0276515 A1    Sep. 28, 2017

(51) Int. Cl.
*G01D 5/20*    (2006.01)
*H02K 24/00*    (2006.01)

(52) U.S. Cl.
CPC ............. *G01D 5/20* (2013.01); *G01D 5/2066* (2013.01); *H02K 24/00* (2013.01)

(58) Field of Classification Search
CPC ..................................................... G01D 5/20
See application file for complete search history.

(56) References Cited

FOREIGN PATENT DOCUMENTS

| JP | 06241834 | A | * | 9/1994 | |
|----|----------|---|---|--------|---|
| JP | 2012-080688 | A | | 4/2012 | |
| JP | 2012-117862 | A | | 6/2012 | |
| JP | WO 2015059911 | A1 | * | 4/2015 | ............. G01P 3/488 |
| JP | 2015145863 | A | * | 8/2015 | |

OTHER PUBLICATIONS

International Search Report for PCT/JP2014/079403 dated Jan. 6, 2015.

* cited by examiner

*Primary Examiner* — David M Gray
*Assistant Examiner* — Milton Gonzalez
(74) *Attorney, Agent, or Firm* — Sughrue Mion, PLLC; Richard C. Turner

(57) ABSTRACT

In a rotation angle detection device for detecting a rotation angle and a rotation speed of a motor generator by using a resolver, a resolver detection accuracy is improved by raising the amplitude or frequency of an excitation signal when the motor generator is performing a driving operation. Furthermore, by reducing the amplitude or frequency of the excitation signal when the motor generator is not performing a driving operation, it is possible to suppress the amount of heat generated by the excitation circuit and the resolver, while maintaining a resolver detection accuracy that enables information about the rotation speed of the motor generator to be obtained.

9 Claims, 4 Drawing Sheets

ROTATION ANGLE DETECTION DEVICE AND ROTATION ANGLE DETECTION METHOD

CROSS REFERENCE TO RELATED APPLICATIONS

This application is a National Stage of International Application No. PCT/JP2014/079403 filed Nov. 6, 2014, the contents of all of which are incorporated herein by reference in their entirety.

TECHNICAL FIELD

The present invention relates to a rotation angle detection device and a rotation angle detection method for detecting a rotation angle and rotation speed of a motor generator, by using a resolver.

BACKGROUND ART

Resolvers, which have a simpler structure than optical encoders and show little error with temperature change, are widely used as rotation angle detection devices for detecting the rotation angle and rotation speed of a motor generator. However, resolvers are susceptible to the effects of external magnetic flux generated by the motor coil, etc. of the motor generator. Therefore, in order to reduce the effects of external magnetic flux, various structural measures have been devised for the coils of a resolver (see, for example, PTL 1).

In a conventional rotation angle detection device using a resolver of this kind, in order to further reduce the effect of external magnetic flux, the S/N ratio of the induction signal induced in the induction coil of the resolver is improved by raising the amplitude or frequency of the excitation signal which is applied to the excitation coil of the resolver.

CITATION LIST

Patent Literature

[PTL 1] Japanese Patent Application Publication No. 2012-117862

SUMMARY OF INVENTION

Technical Problem

However, if the amplitude or frequency of the excitation signal applied to the excitation coil is raised, then there is a problem in that the power consumption of the excitation circuit of the resolver rises. Furthermore, if the amplitude or frequency of the excitation signal applied to the excitation coil is raised, then there is a problem in that the rated capacitance of the switching elements, etc. used in the rotation angle detection device becomes greater, and the elements must be increased in size. Furthermore, in this case, there is a problem in that the amount of generated heat rises due to increased loss in the resolver and the excitation circuit.

Moreover, when a motor generator is performing a power generating operation, a rotational force is applied from the engine which drives the motor generator, and therefore the detection accuracy of the rotation angle and rotation speed of the resolver (abbreviated as "resolver detection accuracy" below) is not required to be of the same level as during a driving operation of the motor generator. More specifically, the resolver detection accuracy during a power generating operation of the motor generator is sufficient provided that the detection accuracy enables the rotation speed to be detected.

Furthermore, even when determining the presence/absence of an abnormality, such as disconnection or shorting, in the resolver, the resolver detection accuracy is not required to be of the same level as during a driving operation of the motor generator. Consequently, there is a problem in that it is inefficient to use the same excitation signal having a large amplitude or frequency during both, for instance, a driving operation, in which high resolver detection accuracy is required, and a power generating operation, in which it is sufficient to maintain a resolver detection accuracy that enables information about the rotation speed of the motor generator to be obtained.

The present invention was devised in order to solve the abovementioned problem, an object thereof being to obtain a rotation angle detection device and a rotation angle detection method wherein downsizing can be achieved, and wherein a high resolver detection accuracy can be obtained during a driving operation of the motor generator, and when the motor generator is not performing a driving operation, the power consumption and amount of heat generated by the excitation circuit and resolver can be suppressed, while maintaining a resolver detection accuracy that enables information about the rotation speed of the motor generator to be obtained.

Solution to Problem

The rotation angle detection device according to the present invention includes: a resolver which has an excitation coil and an induction coil, and which a magnetic field formed by an excitation signal applied to the excitation coil is frequency-modulated by rotation of a motor generator and induced in the induction coil; an excitation circuit which applies the excitation signal, which is sinusoidal, to the excitation coil of the resolver; a power supply circuit which supplies power to the excitation circuit; an amplification circuit which amplifies and outputs an amplitude of an induction signal induced in the induction coil; and an angle calculation unit which detects a rotation angle and a rotation speed of the motor generator, which is capable of a driving operation and a power generating operation, from the excitation signal output by the excitation circuit and from the induction signal output by the amplification circuit, the rotation angle detection device further including: a first switching circuit which, in an on state, switches an amplitude or a frequency of the excitation signal to an "amplitude value when on", or a "frequency when on", by which a required value of a detection accuracy of the resolver during the driving operation of the motor generator is satisfied, and in an off state, switches the amplitude or frequency of the excitation signal to an amplitude value when off, or a frequency when off, by which a detection accuracy of the resolver that enables information about the rotation speed of the motor generator to be obtained is maintained; a second switching circuit which switches an amplification rate of the amplification circuit in such a manner that the amplitude of the induction signal output by the amplification circuit is maintained at a signal level required by the angle calculation unit, regardless of the on/off switching state of the first switching circuit; and a control unit which implements control of switching of on and off on the first switching circuit and the second switching circuit, wherein the control unit switches on both the first switching circuit and the second switching circuit when the motor generator is performing a driving operation and switches off both the first switching circuit and the second switching circuit when the motor generator is not performing a driving operation.

The rotation angle detection method according to the present invention is a rotation angle detection method used in a rotation angle detection device including: a resolver which has an excitation coil and an induction coil, and in which a magnetic field formed by an excitation signal applied to the excitation coil is frequency-modulated by rotation of a motor generator and induced in the induction coil; an excitation circuit which applies the excitation signal, which is sinusoidal, to the excitation coil of the resolver; a power supply circuit which supplies power to the excitation circuit; an amplification circuit which amplifies and outputs an amplitude of an induction signal which is induced in the induction coil; and an angle calculation unit which detects a rotation angle and a rotation speed of the motor generator, which is capable of a driving operation and a power generating operation, from the excitation signal output by the excitation circuit and from the induction signal output by the amplification circuit, the method including: an on switching step in which an amplitude or a frequency of the excitation signal is switched to an amplitude value when on or a frequency when on, by which a required value of a detection accuracy of the resolver is satisfied, during the driving operation of the motor generator, and the amplification rate of the amplification circuit is switched in such a manner that the amplitude of the induction signal output by the amplification circuit is maintained at a signal level required by the angle calculation unit; and an off switching step in which, when the motor generator is not performing the driving operation, the amplitude or frequency of the excitation signal is switched to an amplitude value when off or a frequency when off, by which a detection accuracy of the resolver that enables information about the rotation speed of the motor generator to be obtained is maintained, and the amplification rate of the amplification circuit is switched in such a manner that the amplitude of the induction signal output by the amplification circuit is maintained at a signal level required by the angle calculation unit.

Advantageous Effects of Invention

In the present invention, when the motor generator is performing a driving operation, the resolver detection accuracy is improved by raising the amplitude or frequency of the excitation signal. Furthermore, when a driving operation of the motor generator is not being performed, the amount of heat generated by the resolver and the excitation circuit is suppressed by reducing the amplitude or frequency of the excitation signal. As a result of this, it is possible to obtain a rotation angle detection device and a rotation angle detection method wherein downsizing can be achieved, and wherein a high resolver detection accuracy can be obtained during a driving operation of the motor generator, and when a driving operation of the motor generator is not being performed, the power consumption and amount of heat generated by the excitation circuit and resolver can be suppressed, while maintaining a resolver detection accuracy that enables information about the rotation speed of the motor generator to be obtained.

DESCRIPTION OF EMBODIMENTS

Figure 1:
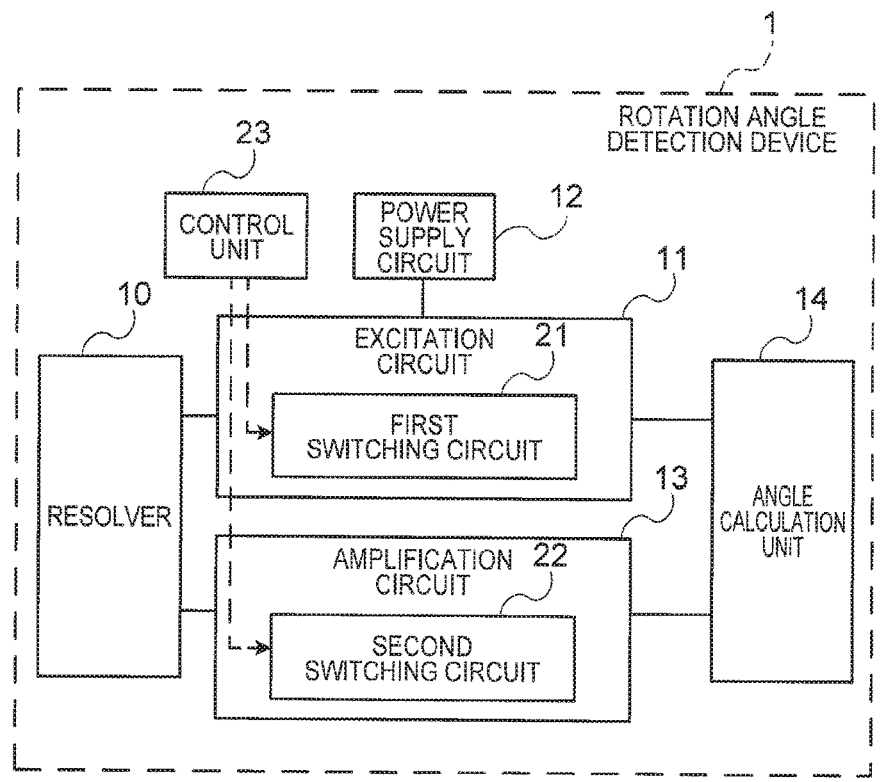
FIG. 1 is a block drawing showing the configuration of a rotation angle detection device according to a first embodiment of the present invention.

Below, preferred embodiments of a rotation angle detection device and a rotation angle detection method according to the present invention are described with reference to the drawings. Parts which are the same or equivalent in the drawings are labelled with the same reference numerals.

First Embodiment

FIG. 1 is a block drawing showing the configuration of a rotation angle detection device 1 according to a first embodiment of the present invention. The rotation angle detection device 1 of the first embodiment comprises a resolver 10, an excitation circuit 11, a power supply circuit 12, an amplification circuit 13, an angle calculation unit 14, a first switching circuit 21, a second switching circuit 22, and a control unit 23.

Figure 2:
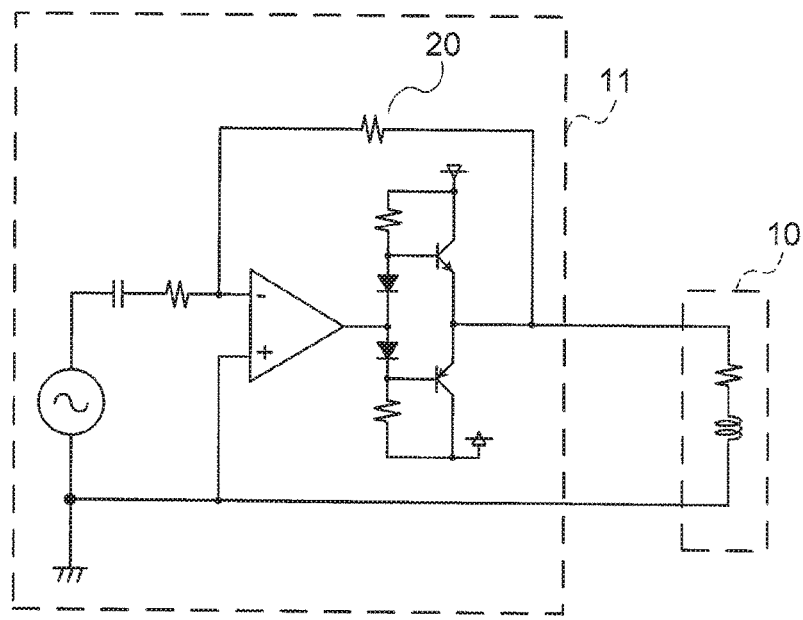
FIG. 2 is a circuit diagram illustrating one example of an excitation circuit in the rotation angle detection device according to the first embodiment of the present invention.

Furthermore, FIG. 2 is a circuit diagram illustrating one example of the excitation circuit 11 in the rotation angle detection device 1 according to the first embodiment of the present invention. Below, the constituent elements and functions of the rotation angle detection device 1 according to the first embodiment will be described with reference to FIG. 1 and FIG. 2.

The resolver 10 has an excitation coil and an induction coil. A magnetic field produced by an excitation signal applied to the excitation coil of the resolver 10 is frequency-modulated by the rotation of a rotary shaft of the motor generator, and induced as an induction signal in the induction coil of the resolver 10. Consequently, by comparing the excitation signal and the induction signal, it is possible to detect the rotation angle and the rotation speed of the motor generator.

The excitation circuit 11 applies a sinusoidal excitation signal to the excitation coil of the resolver 10. Here, if the amplitude or frequency of the excitation signal is made larger, then the magnetic field formed by the excitation signal becomes larger in relation to the effects of external magnetic flux, and therefore the S/N ratio of the resolver 10 is improved and the detection accuracy of the resolver 10 is improved. A push-pull circuit, such as a transistor or operating amplifier, which is illustrated in FIG. 2, is used for the excitation circuit 11, for example. If the excitation circuit 11 is a single power supply circuit, then a push-pull circuit is provided at each of the ends of the excitation coil of the resolver 10.

The power supply circuit 12 supplies power to the excitation circuit 11. A series regulator, switching regulator or charge pump circuit, etc. is used as the power supply circuit 12. A configuration for outputting both positive and negative voltages may be required, depending on the configuration of the excitation circuit 11.

The amplification circuit 13 is connected to the induction coil of the resolver 10 and amplifies the induction signal which is induced in the induction coil of the resolver 10 to a signal level required by the angle calculation unit 14, which is described hereinafter, and then outputs the amplified induction signal. A differential amplification circuit, or the like, using a voltage-dividing resistance or operating amplifier, etc. which adjusts the amplification rate for the amplitude of the envelope of the induction signal induced in the induction coil, is used as the amplification circuit 13.

The angle calculation unit 14 detects the envelope of the induction signal output by the amplification circuit 13, in synchronism with the excitation signal output by the excitation circuit 11, and detects the rotation angle and the rotation speed of the motor generator by using a trigonometric addition theorem.

The first switching circuit 21 according to the first embodiment is provided in the excitation circuit 11, and is controlled to be switched on and off by the control unit 23. The first switching circuit 21, when in an on state, switches a feedback resistance 20 of the operating amplifier which constitutes the excitation circuit 11 illustrated in FIG. 2 to a first resistance which has a larger resistance value. As a result of this, when the first switching circuit 21 was in an off state and the amplitude of the excitation signal, which was an amplitude value when off, is switched to an amplitude value when on, then the detection accuracy of the resolver 10 is improved, when the first switching circuit 21 is in an on state.

For the first switching circuit 21, it is possible to use, for example, a circuit which is formed by serial connection of a transistor switch and a first resistance, and which is connected in parallel with the feedback resistance 20 of the operating amplifier illustrated in FIG. 2. Alternatively, a circuit formed by parallel connection of a transistor switch and the first resistance may be connected in series with the feedback resistance 20.

Here, the amplitude value when on of the excitation signal is set to an amplitude value of the excitation signal by which the required value of the detection accuracy of the resolver 10 can be satisfied during a driving operation of the motor generator, taking the effects of the external magnetic flux into consideration.

Furthermore, the amplitude value when off of the excitation signal is set to an amplitude value of the excitation signal which makes it possible to supress the amount of heat generated by the excitation circuit 11 and the resolver 10, while maintaining a detection accuracy of the resolver 10 by which information about the rotation speed of the motor generator can be obtained, when not performing a driving operation of the motor generator.

Furthermore, the resistance value of the first resistance and the resistance value of the feedback resistance 20 are set such that the size of the amplitude of the excitation signal applied to the excitation coil respectively becomes the amplitude value when on, and the amplitude value when off.

The second switching circuit 22 is provided in the amplification circuit 13, and is switched on and off, together with the first switching circuit 21, by the control unit 23. In an on state, the second switching circuit 22 suppresses the amplification rate of the amplification circuit 13, by switching a resistance (not illustrated) which sets the amplification rate of the amplification circuit 13 to a second resistance having a smaller resistance value.

For the second switching circuit 22, it is possible to use, for example, a circuit which is formed by serial connection of a transistor switch and a second resistance, and which is connected in parallel with the resistance which sets the amplification rate of the amplification circuit 13. Alternatively, a circuit formed by parallel connection of a transistor switch and the second resistance may be connected in series with the resistance which sets the amplification rate of the amplification circuit 13.

Here, the resistance value of the second resistance is set in such a manner that the effect of increasing the amplitude of the excitation signal by the first switching circuit 21 and the effect of suppressing the amplitude of the induction signal by the second switching circuit 22 cancel each other out exactly when the first switching circuit 21 and the second switching circuit 22 are both in the on state. Therefore, the amplitude of the induction signal output by the amplification circuit 13 can be maintained at a uniform signal level required by the angle calculation unit 14, regardless of the on/off switching state of the first switching circuit 21.

The control unit 23 improves the detection accuracy of the resolver 10 by switching on both the first switching circuit 21 and the second switching circuit 22 during a driving operation of the motor generator in which a higher detection accuracy is required of the resolver 10. On the other hand, when a driving operation of the motor generator is not being performed, the control unit 23 suppresses the amount of heat generated by the excitation circuit 11 and the resolver 10, while maintaining the minimum detection accuracy of the resolver 10 which enables information about the rotation speed of the motor generator to be obtained, by switching off both the first switching circuit 21 and the second switching circuit 22.

Figure 3:
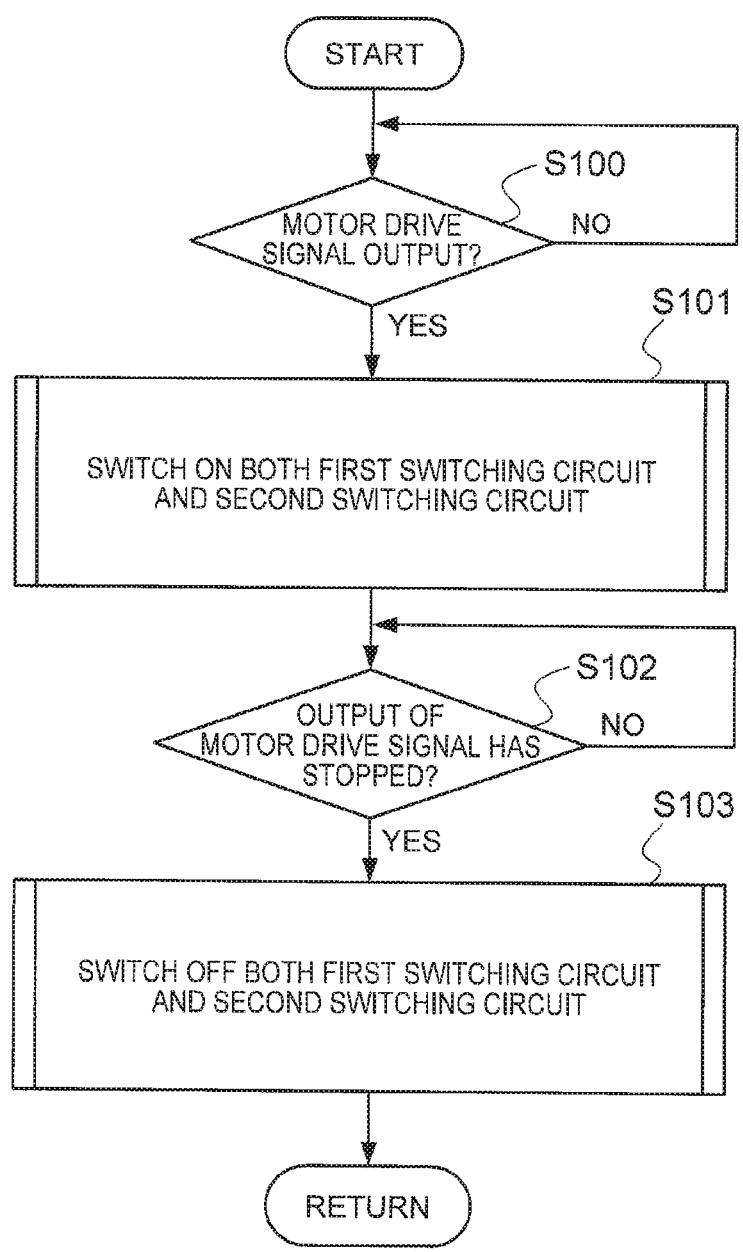
FIG. 3 is a flowchart which illustrates a switching operation of a first switching circuit and a second switching circuit in the rotation angle detection device according to the first embodiment of the present invention.

FIG. 3 is a flowchart illustrating a switching operation of the first switching circuit 21 and the second switching circuit 22 in the rotation angle detection device 1 according to the first embodiment of the present invention. Below, the switching operation of the first switching circuit 21 and the second switching circuit 22 by the control unit 23 is described specifically with reference to the flowchart illustrated in FIG. 3.

In step S100, the control unit 23 checks whether or not a controller which controls the motor generator (not illustrated) has output a motor drive signal for driving operation of the motor generator. The control unit 23 advances to step S101, if the motor drive signal has output a motor drive signal (YES). If this is not the case (NO), then the control unit 23 waits for the motor drive signal to be output.

In step S101, the control unit 23 improves the detection accuracy of the resolver 10, by switching on both the first switching circuit 21 and the second switching circuit 22. The control unit 23 then advances to step S102.

In step S102, the control unit 23 monitors whether the motor drive signal output by the controller which controls the motor generator has stopped. The control unit 23 advances to step S103 if the output of the motor drive signal has stopped (YES). If this is not the case (NO), then the control unit 23 waits for output of the motor drive signal to be stopped.

In step S103, the control unit 23 suppresses the amount of heat generated by the excitation circuit 11 and the resolver 10, while maintaining a detection accuracy of the resolver 10 which enables information about the rotation speed of the motor generator to be obtained, by switching off both the first switching circuit 21 and the second switching circuit 22.

When controlling the on/off switching of the first switching circuit 21 and the second switching circuit 22 by the control unit 23, there is a possibility of the rotation angle detection device 1 being erroneously detected as abnormal, due to discontinuity in the excitation signal and the induction signal of the resolver 10. Therefore, a filter is provided at the input portion of the transistor switches which is used in the first switching circuit 21 and the second switching circuit 22. Consequently, the first switching circuit 21 and the second switching circuit 22 are switched gradually using the voltage amplification characteristics of the transistor and the on resistance characteristics of the MOSFET, and therefore erroneous detection can be avoided.

As described above, in the first embodiment, the resolver detection accuracy is improved by raising the amplitude of the excitation signal, during a driving operation of the motor generator. Furthermore, when a driving operation of the motor generator is not being performed, the amount of heat generated by the resolver and the excitation circuit is suppressed by reducing the amplitude of the excitation signal. As a result of this, it is possible to obtain a rotation angle detection device and a rotation angle detection method wherein downsizing can be achieved, and wherein a high resolver detection accuracy can be obtained during a driving operation of the motor generator, and when a driving operation of the motor generator is not being performed, the power consumption and amount of heat generated by the excitation circuit and resolver can be suppressed, while maintaining a resolver detection accuracy that enables information about the rotation speed of the motor generator to be obtained.

Furthermore, by suppressing the amount of heat generated by the excitation circuit and the resolver, it is possible to suppress increase in the temperature of the inverter which drives the motor generator, and therefore the upper limit temperature which is set with the purpose of protecting against overheating can be relaxed, and the size of the power semiconductor switching elements in the inverter can be reduced.

Second Embodiment

The first embodiment above describes a method which increases the amplitude of the excitation signal to improve the detection accuracy of the resolver 10 by providing the first switching circuit 21 in the excitation circuit 11 and switching the feedback resistance 20 of the operating amplifier of the excitation circuit 11. Meanwhile, the second embodiment describes a method in which the amplitude of the excitation signal is raised in accordance with the output voltage of the power supply circuit 12 to improve the detection accuracy of the resolver 10, by providing the first switching circuit 21 in the power supply circuit 12 and switching the output voltage of the power supply circuit 12.

Figure 4:
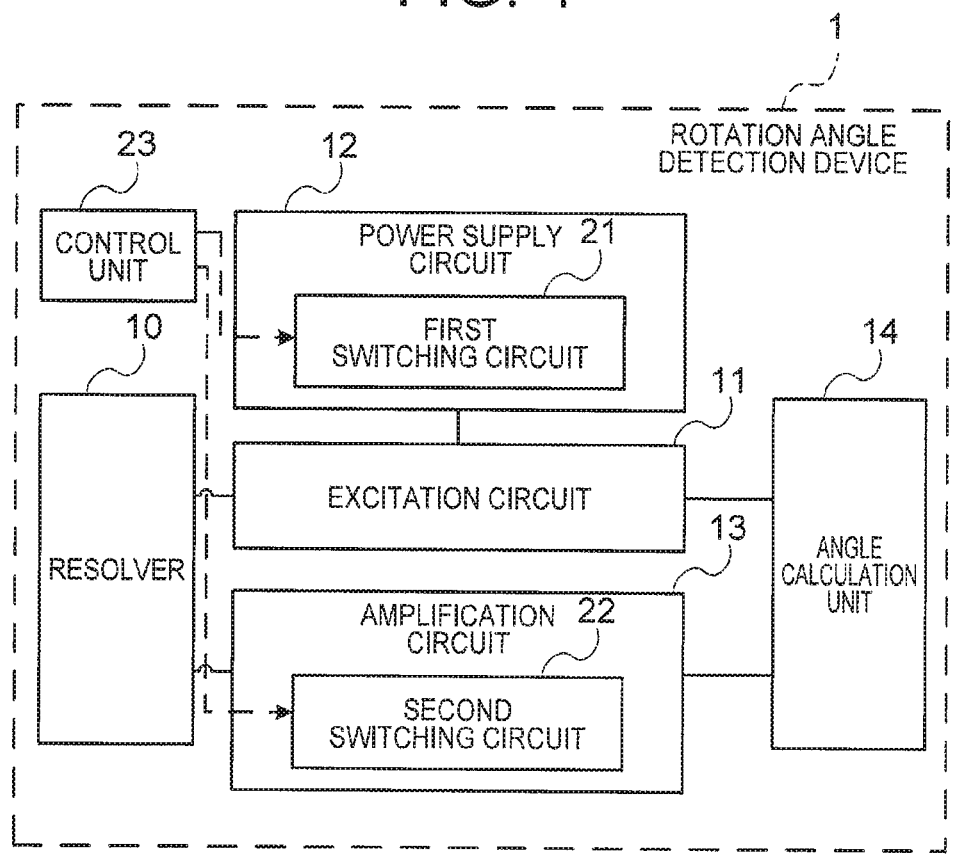
FIG. 4 is a block drawing showing the configuration of a rotation angle detection device according to a second embodiment of the present invention.

FIG. 4 is a block drawing showing the configuration of the rotation angle detection device 1 according to the second embodiment of the present invention. FIG. 4 differs from FIG. 1 relating to the first embodiment in that the first switching circuit 21 is provided inside the power supply circuit 12 rather than inside the excitation circuit 11. The remainder of the configuration is the same as FIG. 1 and therefore explanation thereof is omitted here.

The first switching circuit 21 according to the second embodiment illustrated in FIG. 4 is provided in the power supply circuit 12 and is controlled to be switched on and off by the control of the control unit 23. The first switching circuit 21, when in an on state, switches a feedback resistance (not illustrated) that sets the output voltage of the power supply circuit 12, to a third resistance which has a larger resistance value. As a result of this, the detection accuracy of the resolver 10 is improved, since the amplitude value of the excitation signal applied to the excitation coil becomes larger in accordance with the output voltage of the power supply circuit 12.

For the first switching circuit 21, it is possible to use, for example, a circuit which is formed by serial connection of a transistor switch and a third resistance, and which is connected in parallel with the feedback resistance of the power supply circuit 12. Alternatively, a circuit formed by parallel connection of a transistor switch and the third resistance may be connected in series with the feedback resistance of the power supply circuit 12.

Here, the resistance value of the third resistance, and the resistance value of the feedback resistance which sets the output value of the power supply circuit 12, are set in such a manner that the size of the amplitude of the excitation signal applied to the excitation coil respectively becomes the amplitude value when on, or the amplitude value when off, in accordance with the output voltage of the power supply circuit 12.

Figure 5:
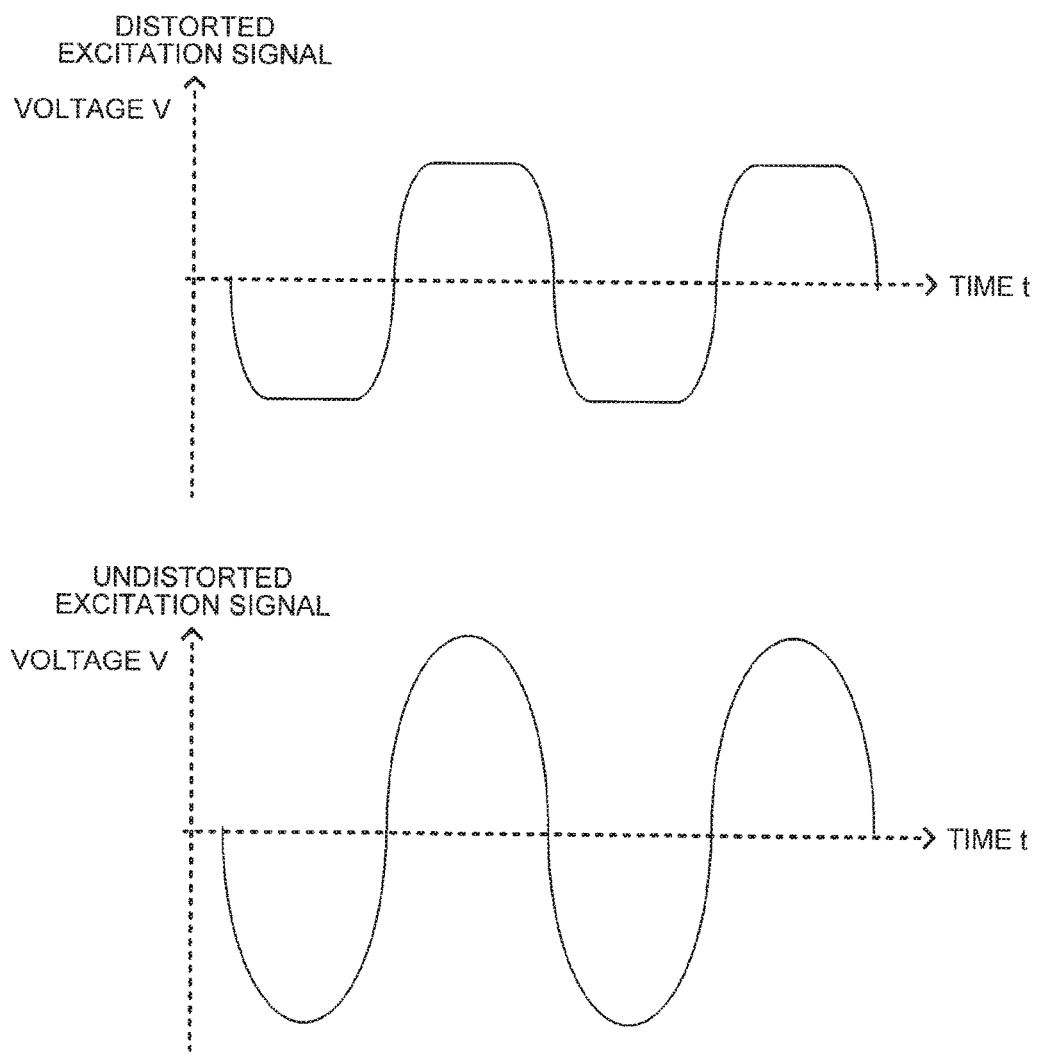
FIG. 5 is an illustrative diagram depicting an output waveform of an excitation circuit in the rotation angle detection device according to the second embodiment of the present invention.

FIG. 5 is an illustrative drawing showing an output waveform of the excitation circuit 11 of the rotation angle detection device 1 according to the second embodiment of the present invention. When the first switching circuit 21 is off, there is a possibility of increased error in the detection accuracy of the resolver 10 caused by distortion of the output waveform of the operating amplifier in the excitation circuit 11, as illustrated in FIG. 5, due to the fact that the output voltage of the power supply circuit 12 is set to a low voltage.

However, the output voltage of the power supply circuit 12 is set to a low voltage in this way in cases where the motor generator is not performing a driving operation. Therefore, in cases such as this, the resolver detection accuracy is not required to be of the same level as during a driving operation of the motor generator, and therefore the distortion of the excitation signal has little effect on the detection accuracy of the resolver 10. Furthermore, when rotating idly, the motor generator rotates at a high number of revolutions, for example, about 1000 r/min, and therefore the effect of the distortion of the excitation signal on the detection accuracy of the resolver 10 is relatively small.

In this way, with the configuration of the second embodiment also, it is possible to improve the detection accuracy of the resolver 10 by raising the amplitude of the excitation signal applied to the excitation coil of the resolver 10 in accordance with the output voltage of the power supply circuit 12, through switching on both the first switching circuit 21 and the second switching circuit 22 by a similar procedure to the first embodiment described above.

As described above, in the second embodiment, the resolver detection accuracy is improved by raising the amplitude of the excitation signal in accordance with the output voltage of the power supply circuit, during a driving operation of the motor generator. Furthermore, when a driving operation of the motor generator is not being performed, the amount of heat generated by the resolver and the excitation circuit is suppressed by reducing the amplitude of the excitation signal in accordance with the output voltage of the power supply circuit. As a result of this, it is possible to obtain a rotation angle detection device and a rotation angle detection method wherein downsizing can be achieved, and wherein a high resolver detection accuracy can be obtained during a driving operation of the motor generator, and when a driving operation of the motor generator is not being performed, the power consumption and amount of heat generated by the excitation circuit and resolver can be suppressed, while maintaining a resolver detection accuracy that enables information about the rotation speed of the motor generator to be obtained.

Furthermore, by suppressing the amount of heat generated by the power supply circuit, the excitation circuit and the resolver, it is possible to suppress increase in the temperature of the inverter which drives the motor generator, and therefore the upper limit temperature which is set with the purpose of protecting against overheating can be relaxed, and the size of the power semiconductor switching elements in the inverter can be reduced.

Third Embodiment

The first embodiment above describes a method which raises the amplitude of the excitation signal to improve the detection accuracy of the resolver 10 by switching the feedback resistance 20 of the operating amplifier of the excitation circuit 11. Meanwhile, a third embodiment of the present invention describes a method which raises the frequency of the excitation signal to improve the detection accuracy of the resolver 10, by switching the resistance of the excitation circuit 11 which sets the transmission frequency of the excitation signal.

A block diagram illustrating the configuration of the rotation angle detection device 1 according to the third embodiment of the present invention is the same as FIG. 1 relating to the first embodiment described above. However, the third embodiment differs from the first embodiment described above in that the first switching circuit 21 switches the frequency of the excitation signal, rather than the size of the excitation signal. The remainder of the configuration is the same as FIG. 1 and therefore explanation thereof is omitted here.

The first switching circuit 21 according to the third embodiment is provided in the excitation circuit 11, and is controlled to be switched on and off by the control of the control unit 23. When in an on state, the first switching circuit 21 switches a resistance (not illustrated) which sets the transmission frequency of the excitation circuit 11, to a fourth resistance. As a result of this, when the first switching circuit 21 was in the off state and the frequency of the excitation signal, which was the frequency when off, is switched to a frequency when on, then the detection accuracy of the resolver 10 is improved when the first switching circuit 21 is in the on state.

For the first switching circuit 21, it is possible to use, for example, a circuit which is formed by serial connection of a transistor switch and a fourth resistance, and which is connected in parallel with the resistance which sets the transmission frequency of the excitation circuit 11. Alternatively, a circuit formed by parallel connection of a transistor switch and the fourth resistance may be connected in series with the resistance which sets the transmission frequency of the excitation circuit 11.

Here, the frequency when on of the excitation signal is set to a frequency value of the excitation signal by which the required value of the detection accuracy of the resolver 10 can be satisfied during a driving operation of the motor generator, taking the effects of the external magnetic flux into consideration.

Furthermore, the frequency value when off of the excitation signal is set to a frequency value of the excitation signal which makes it possible to supress the amount of heat generated by the excitation circuit 11 and the resolver 10, while maintaining a detection accuracy of the resolver 10 by which information about the rotation speed of the motor generator can be obtained, when not performing a driving operation of the motor generator.

Furthermore, the resistance value of the fourth resistance and the resistance value of the feedback resistance 20 are set such that the size of the frequency of the excitation signal applied to the excitation coil respectively becomes the frequency when on, and the frequency when off, taking the impedance characteristics of the excitation coil into consideration.

The frequency of the excitation signal is required to have a sufficiently large value compared to the maximum value of the number of revolutions of the motor generator. The frequency when off can also be reduced, since it is sufficient to maintain a detection accuracy of the resolver 10 that enables information about the rotation speed of the motor generator to be obtained.

In this way, with the configuration of the third embodiment also, it is possible to improve the detection accuracy of the resolver 10 by raising the frequency of the excitation signal applied to the excitation coil of the resolver 10, through switching on both the first switching circuit 21 and the second switching circuit 22 by a similar procedure to the first embodiment described above.

As described above, in the third embodiment, the resolver detection accuracy is improved by raising the frequency of the excitation signal, during a driving operation of the motor generator. Furthermore, when a driving operation of the motor generator is not being performed, the amount of heat generated by the resolver and the excitation circuit is suppressed by reducing the frequency of the excitation signal. As a result of this, it is possible to obtain a rotation angle detection device and a rotation angle detection method wherein downsizing can be achieved, and wherein a high resolver detection accuracy can be obtained during a driving operation of the motor generator, and when a driving operation of the motor generator is not being performed, the power consumption and amount of heat generated by the excitation circuit and resolver can be suppressed, while maintaining a resolver detection accuracy that enables information about the rotation speed of the motor generator to be obtained.

Furthermore, by suppressing the amount of heat generated by the excitation circuit and the resolver, it is possible to suppress increase in the temperature of the inverter which drives the motor generator, and therefore the upper limit temperature which is set with the purpose of protecting against overheating can be relaxed, and the size of the power semiconductor switching elements in the inverter can be reduced.

In the first to third embodiments described above, the first switching circuit 21 switches an existing resistance to the first resistance, the third resistance or the fourth resistance, when in an on state, but it is also possible to adopt a configuration wherein the first switching circuit 21 is provided with two resistances, a resistance for an on state and a resistance for an off state, and switches between these two resistances, when in the on state and the off state.

In this case, when in the on state, the first switching circuit 21 is switched to the resistance for an on state which has a resistance value whereby the amplitude or frequency of the excitation signal becomes the amplitude value when on or the frequency when on described above, and when in the off state, the first switching circuit 21 is switched to the resistance for an off state which has a resistance value whereby the amplitude or frequency of the excitation signal becomes the amplitude value when off or the frequency when off described above.

The invention claimed is:

1. A rotation angle detection device, comprising:
a resolver which has an excitation coil and an induction coil, and in which a magnetic field formed by an excitation signal applied to the excitation coil is frequency-modulated by rotation of a motor generator and induced in the induction coil;
an excitation circuit which applies the excitation signal, which is sinusoidal, to the excitation coil of the resolver;
a power supply circuit which supplies power to the excitation circuit;
an amplification circuit which amplifies and outputs an amplitude of an induction signal induced in the induction coil; and
an angle calculation unit which detects a rotation angle and a rotation speed of the motor generator, which is capable of a driving operation and a power generating operation, from the excitation signal output by the excitation circuit and from the induction signal output by the amplification circuit,
the rotation angle detection device further comprising:
a first switching circuit which, in an on state, switches an amplitude or a frequency of the excitation signal to an amplitude value when on, or a frequency when on, by which a required value of a detection accuracy of the resolver during the driving operation of the motor generator is satisfied, and in an off state, switches the amplitude or frequency of the excitation signal to an amplitude value when off, or a frequency when off, by which a detection accuracy of the resolver that enables information about the rotation speed of the motor generator to be obtained is maintained;
a second switching circuit which switches an amplification rate of the amplification circuit in such a manner that the amplitude of the induction signal output by the amplification circuit is maintained at a signal level required by the angle calculation unit, regardless of the on/off switching state of the first switching circuit; and
a control unit which implements control of on and off of switching on the first switching circuit and the second switching circuit, wherein
the control unit switches on both the first switching circuit and the second switching circuit when the motor generator is performing the driving operation; and
switches off both the first switching circuit and the second switching circuit when the motor generator is not performing the driving operation.

2. The rotation angle detection device according to claim 1,
wherein when the first switching circuit is in an off state, a resistance value of a feedback resistance of an operating amplifier constituting the excitation circuit is set in such a manner that the amplitude of the excitation signal becomes the amplitude value when off; and
the first switching circuit is provided in the excitation circuit and, when in an on state, switches the feedback resistance of the operating amplifier of the excitation circuit to a first resistance by which the amplitude of the excitation signal becomes the amplitude value when on, and, when in an off state, to the feedback resistance of the operating amplifier to the excitation circuit.

3. The rotation angle detection device according to claim 2, wherein:

the second switching circuit is provided in the amplification circuit;
when the second switching circuit in an on state, an amplification rate of the amplification circuit is controlled to suppress the amplification rate of the amplification circuit;
when the second switching circuit in an off state, the amplification circuit is controlled to have an amplification state; and
the second switching circuit is controlled in such a manner that an effect of increasing the amplitude of the excitation signal by the first switching circuit and an effect of suppressing the amplitude of the induction signal by the second switching circuit cancel each other out when both the first switching circuit and the second switching circuit are in the on state.

4. The rotation angle detection device according to claim 1, wherein:
the first switching circuit is provided in the power supply circuit;
when the first switching circuit is in the off state, an output voltage of the power supply circuit is controlled in such a manner that the amplitude of the excitation signal becomes the amplitude value when off; and
when the first switching circuit is in the on state, the output voltage of the power supply circuit is controlled in such a manner that the amplitude of the excitation signal becomes the amplitude value when on.

5. The rotation angle detection device according to claim 4, wherein:
the second switching circuit is provided in the amplification circuit;
when the second switching circuit is in an on state, amplification rate of the amplification circuit is controlled to suppress the amplification rate of the amplification circuit;
when the second switching circuit is in an off state, the amplification circuit is controlled to have an amplification state; and
the second switching circuit is controlled in such a manner that an effect of increasing the amplitude of the excitation signal by the first switching circuit and an effect of suppressing the amplitude of the induction signal by the second switching circuit cancel each other out when both the first switching circuit and the second switching circuit are in the on state.

6. The rotation angle detection device according to claim 1, wherein:
the first switching circuit is provided in the excitation circuit;
when the first switching circuit is in the off state, a transmission frequency of the excitation circuit is controlled in such a manner that the frequency of the excitation signal becomes the frequency when off; and
when the first switching circuit is in the on state, the transmission frequency of the excitation circuit is controlled in such a manner that the frequency of the excitation signal becomes the frequency when on.

7. The rotation angle detection device according to claim 6, wherein:
the second switching circuit is provided in the amplification circuit;
when the second switching circuit is in an on state, an amplification rate of the amplification circuit is controlled to suppress the amplification rate of the amplification circuit;

when the second switching circuit is in an off state, the amplification circuit is controlled to have an amplification state; and the second switching circuit is controlled in such a manner that an effect of increasing the amplitude of the excitation signal by the first switching circuit and an effect of suppressing the amplitude of the induction signal by the second switching circuit cancel each other out when both the first switching circuit and the second switching circuit are in the on state.

8. The rotation angle detection device according to claim 1, wherein:

the second switching circuit is provided in the amplification circuit;

when the second switching circuit is in an on state, an amplification rate of the amplification circuit is controlled to suppress the amplification rate of the amplification circuit;

when the second switching circuit is in an off state, the amplification circuit is controlled to have an amplification state; and the second switching circuit is controlled in such a manner that an effect of increasing the amplitude of the excitation signal by the first switching circuit and an effect of suppressing the amplitude of the induction signal by the second switching circuit cancel each other out when both the first switching circuit and the second switching circuit are in the on state.

9. A rotation angle detection method used in a rotation angle detection device including:

a resolver which has an excitation coil and an induction coil, and in which a magnetic field formed by an excitation signal applied to the excitation coil is frequency-modulated by rotation of a motor generator and induced in the induction coil;

an excitation circuit which applies the excitation signal, which is sinusoidal, to the excitation coil of the resolver;

a power supply circuit which supplies power to the excitation circuit;

an amplification circuit which amplifies and outputs an amplitude of an induction signal which is induced in the induction coil; and an angle calculation unit which detects a rotation angle and a rotation speed of the motor generator, which is capable of a driving operation and a power generating operation, from the excitation signal output by the excitation circuit and from the induction signal output by the amplification circuit, the method comprising:

an on switching step in which, when the motor generator is performing the driving operation, an amplitude or a frequency of the excitation signal is switched to an amplitude value when on or a frequency when on by which a required value of a detection accuracy of the resolver is satisfied, and the amplification rate of the amplification circuit is switched in such a manner that the amplitude of the induction signal output by the amplification circuit is maintained at a signal level required by the angle calculation unit; and an off switching step in which, when the motor generator is not performing the driving operation, the amplitude or frequency of the excitation signal is switched to an amplitude value when off or a frequency when off, by which a detection accuracy of the resolver that enables information about the rotation speed of the motor generator to be obtained is maintained, and the amplification rate of the amplification circuit is switched in such a manner that the amplitude of the induction signal output by the amplification circuit is maintained at a signal level required by the angle calculation unit.

* * * * *